US008214341B2

(12) United States Patent
Bartfai et al.

(10) Patent No.: US 8,214,341 B2
(45) Date of Patent: Jul. 3, 2012

(54) DETERMINING WHEN TO APPLY WRITES RECEIVED TO DATA UNITS BEING TRANSFERRED TO A SECONDARY STORAGE

(75) Inventors: Robert Francis Bartfai, Tucson, AZ (US); Michael E. Factor, Haifa (IL); Shachar Fienblit, Ein Ayala (IL); Olympia Gluck, Haifa (IL); Eyal Gordon, Haifa (IL); Thomas Charles Jarvis, Tucson, AZ (US); Eli Malul, Tirat Carmel (IL); Carol Santich Mellgren, Tucson, AZ (US); Gail Andrea Spear, Tucson, AZ (US); Aviad Zlotnick, D.N.G.T. (IL)

(73) Assignee: International Business Machines Corporation, Armonk, NY (US)

(*) Notice: Subject to any disclaimer, the term of this patent is extended or adjusted under 35 U.S.C. 154(b) by 447 days.

(21) Appl. No.: 12/060,086

(22) Filed: Mar. 31, 2008

(65) Prior Publication Data
US 2009/0249116 A1 Oct. 1, 2009

(51) Int. Cl.
*G06F 13/00* (2006.01)
*G06F 17/00* (2006.01)
(52) U.S. Cl. .............. 707/703; 707/704; 711/163
(58) Field of Classification Search .......... 707/659, 707/675, 704, 818, 827, 999.202–999.206, 707/703; 711/100, 113, 154, 161–163
See application file for complete search history.

(56) References Cited

U.S. PATENT DOCUMENTS

| | | | |
|---|---|---|---|
| 6,502,205 B1 | 12/2002 | Yanai et al. | |
| 7,171,517 B2* | 1/2007 | Muto et al. | 711/113 |
| 7,188,292 B2 | 3/2007 | Cordina et al. | |
| 7,237,063 B2* | 6/2007 | Miki | 711/114 |
| 7,315,926 B2* | 1/2008 | Fridella et al. | 711/163 |
| 7,360,047 B2* | 4/2008 | Muto | 711/162 |
| 7,370,064 B2* | 5/2008 | Yousefi'zadeh | 1/1 |
| 2007/0038825 A1 | 2/2007 | Kawamura et al. | |

* cited by examiner

*Primary Examiner* — Marc Filipczyk
(74) *Attorney, Agent, or Firm* — David W. Victor; Konrad Raynes and Victor LLP (57) ABSTRACT

Provided are a method, system, and article of manufacture for managing writes received to data units that are being transferred to a secondary storage as part of a mirror relationship. Synchronization information indicates data units to transfer from a primary storage to a secondary storage, wherein the synchronization information data is updated to indicate the transfer of one of the data units from the primary storage to the secondary storage. A storage controller receives a write request having an update to a target data unit comprising one of the data units indicated in the synchronization information that has not been transferred from the primary storage to the secondary storage. The write request is allowed to apply the update to the target data unit in response to transferring the data in the target data unit to a network adapter of the storage controller and before the data in the target data unit is transferred to the secondary storage.

19 Claims, 5 Drawing Sheets

FIG. 1

Transfer Information

FIG. 2

Lock Information

DETERMINING WHEN TO APPLY WRITES RECEIVED TO DATA UNITS BEING TRANSFERRED TO A SECONDARY STORAGE

BACKGROUND OF THE INVENTION

1. Field of the Invention

The present invention relates to a method, system, and article of manufacture for managing writes received to data units that are being transferred to a secondary storage as part of a mirror relationship.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices.

Peer to Peer Remote Copy (PPRC) is a data mirroring solution offered on high end storage systems as part of a solution for disaster recovery. In synchronous PPRC, a writing host does not get an acknowledgement of write complete until the data is written in both the primary and secondary control units. In asynchronous PPRC, a host write to a primary controller gets an acknowledgement when the write operation is completed at the primary storage controller, i.e., when the data resides in the primary storage controller's cache. The primary controller may secure the data to store two cache copies and also copy the data to a secondary controller. With asynchronous PPRC, there is a risk of data loss if the primary controller crashes before copying the data to the secondary storage controller because the data that failed to transfer cannot be recovered.

In one prior art system, a consistency group may be formed by creating a consistent point across a replication environment, transmitting the updates to the secondary location, and saving consistent data to ensure a consistent image of the data is always available. A collision may occur if there is an update to a track that has not yet been copied to the secondary location. To protect the data in the consistency group, the completion of the write is delayed until the previous version of the track image has been sent to the secondary storage controller. For many intensive write workloads such as log volume updates that are performed in a sequential fashion (using 4 k blocks of data), the same track data is updated several consecutive times. For such workloads the collision algorithm may result in latency problems for the writes. The collision time is linear to the distance between the primary and the secondary sites. Another type of collision involves a common locking mechanism which is used while transferring a track from the primary storage controller to the secondary storage controller. When a track is sent from the primary to the secondary controller, a lock on the primary track is held so consecutive updates for the same track are delayed while the transfer is in progress.

There is a need in the art for an improved technique to handle collisions of writes to tracks that are being transferred to a secondary site as part of a data mirroring operation.

SUMMARY

Provided are a method, system, and article of manufacture for managing writes received to data units that are being transferred to a secondary storage as part of a mirror relationship. Synchronization information indicates data units to transfer from a primary storage to a secondary storage, wherein the synchronization information data is updated to indicate the transfer of one of the data units from the primary storage to the secondary storage. A storage controller receives a write request having an update to a target data unit comprising one of the data units indicated in the synchronization information that has not been transferred from the primary storage to the secondary storage. The write request is allowed to apply the update to the target data unit in response to transferring the data in the target data unit to a network adapter of the storage controller and before the data in the target data unit is transferred to the secondary storage.

DETAILED DESCRIPTION

Figure 1:
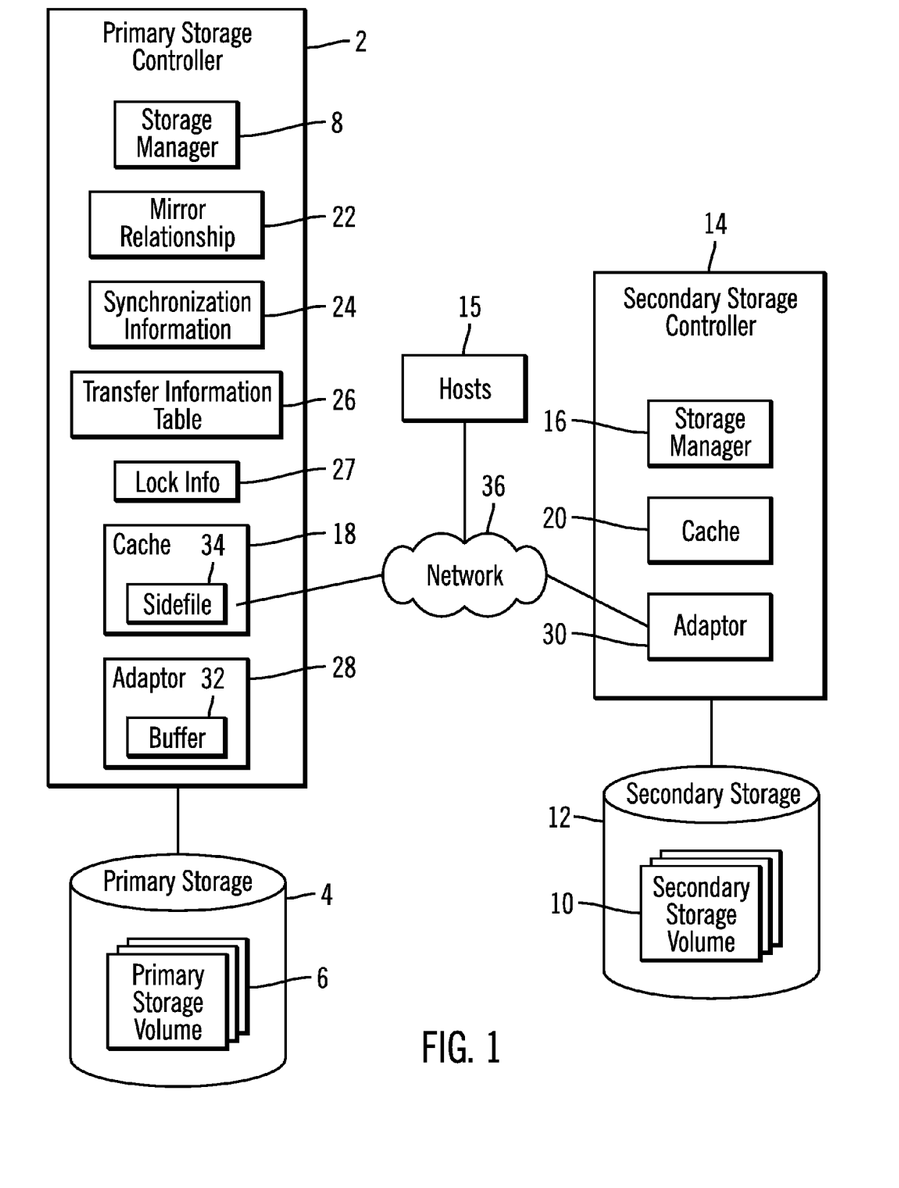
FIG. 1 illustrates an embodiment of a network computing environment.

FIG. 1 illustrates an embodiment of a network computing environment. A primary storage controller 2 manages Input/Output (I/O) requests to a primary storage 4 in which primary storage volumes 6 are configured. The primary storage controller 2 includes a storage manager 8 program that manages I/O requests to the primary storage volumes 6 and may maintain mirror storage policies to mirror data in the primary storage volumes to corresponding secondary storage volumes 10 in a secondary storage 12. A secondary storage controller 14 includes a storage manager 16 program to manage I/O access to the secondary storage 12.

The primary 2 and secondary 14 storage controllers include a cache 18 and 20, respectively, to buffer read and write data to their corresponding storage volumes 6 and 10. The primary 2 and secondary 14 storage controllers may receive read and write requests from host systems 15.

The primary storage manager 8 may maintain mirror relationship information 22 indicating primary storage volumes 6 and secondary storage volumes 10 in a mirror relationship 22.

The primary storage manager 8 maintains synchronization information 24 indicating tracks in the primary storage volume 6 in a mirror relationship 22 to copy to corresponding tracks in the secondary storage volume 10 as part of a consistency group having a consistency time. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

The synchronization information 24 indicates whether the indicated tracks (or other data units) have been copied over to the secondary storage 12. Tracks in a consistency group copied from the primary 6 to the secondary 10 volumes comprise tracks having data consistent as of the consistency time. In one embodiment, the synchronization information 24 is updated to reflect that a track has been mirrored to the secondary volume 10 in response to receiving acknowledgment from the secondary storage controller 14 that the write completed, which is a synchronous transfer. The data in the mirror relationship 22 represented by the synchronization information 24 is completely copied after all the tracks indicated in the synchronization information 24 are indicated as copied to the corresponding secondary volume 10. In one embodiment, the synchronization information 24 may include a bitmap having a bit for each track in the primary volume 6 in the mirror relationship, where the bit for a track is set to one value to indicate that the track has not been copied and set to another value to indicate that the track has been copied.

The storage manager 8 further includes a transfer information table 26 having an entry for each track that is in progress of being copied to the secondary volume 10 as part of a mirror copy operation. The storage manager 8 also maintains lock information 27 indicating the lock status for each track in the primary storage volume 6.

Both the primary 2 and secondary 14 storage controllers include adapters 28 and 30, respectively. Tracks transferred from the primary storage controller 2 to the secondary storage controller 14 may be buffered in a buffer 32 of the adapter 28 before being transferred.

In one embodiment, the cache 18 may include a sidefile 34, such that to manage a mirror relationship 22, the storage manager 8 in the primary storage controller 2 may buffer data in the primary storage volumes 6 being transferred to the secondary storage controller 14 to store in corresponding secondary volumes 10 in the sidefile 34. The data may be removed from the sidefile 34 upon receiving acknowledgment that the data was copied to the secondary storage volume 10. In such an embodiment, the storage manager 8 may only buffer tracks indicated in the synchronization information 24 that is in-progress of being transferred to the secondary storage volume 10. Thus, the sidefile 34 need only be a size to accommodate the maximum number of tracks that may concurrently be transferred to the secondary storage volume 10 during mirror operations.

Figure 2:
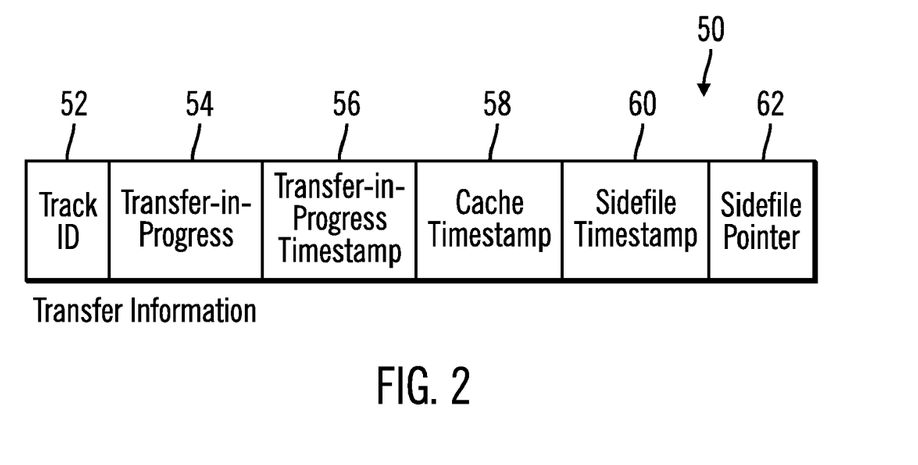
FIG. 2 illustrates an embodiment of transfer information concerning the transfer of a track to secondary storage in a mirror relationship.

FIG. 2 illustrates transfer information 50 maintained in the transfer information table 26 that is maintained for a track (or other data unit subject to the transfer) that is being transferred to the secondary storage controller 14 as part of the synchronization. The transfer information 50 includes a track identifier (ID) 52 identifying the track being transferred, a transfer-in-progress field 54 indicating whether the track is in progress of being transferred to the corresponding secondary storage volume 10, and a cache timestamp 58 that is a timestamp of a version of the track in the cache 18. If the track is updated in cache 18 while the earlier version of the track is in progress of being transferred, then the cache timestamp 58 may be later than the timestamp of the track being transferred. If a sidefile 34 is maintained, then a sidefile timestamp 60 is a timestamp of the track added to the sidefile 34 that is in progress of being transferred to the secondary storage volume 10. If the track is updated in the cache 18 while being transferred, then the cache timestamp 58 may be greater than the sidefile timestamp 60 of the track being transferred. The sidefile pointer 62 indicates the location of the track in the sidefile 34.

Figure 3:
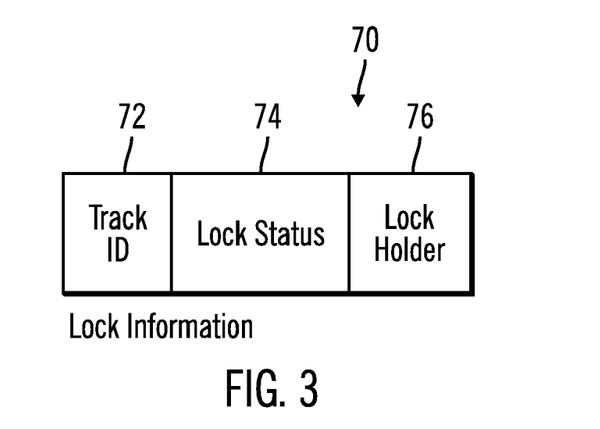
FIG. 3 illustrates an embodiment of lock information for a track.

FIG. 3 illustrates a lock 70 maintained in the lock information 27 for a track, including a track identifier (ID) 72, a lock status 74 for the tracks, write lock held, read lock held, etc., and the lock holder 76.

Figure 4:
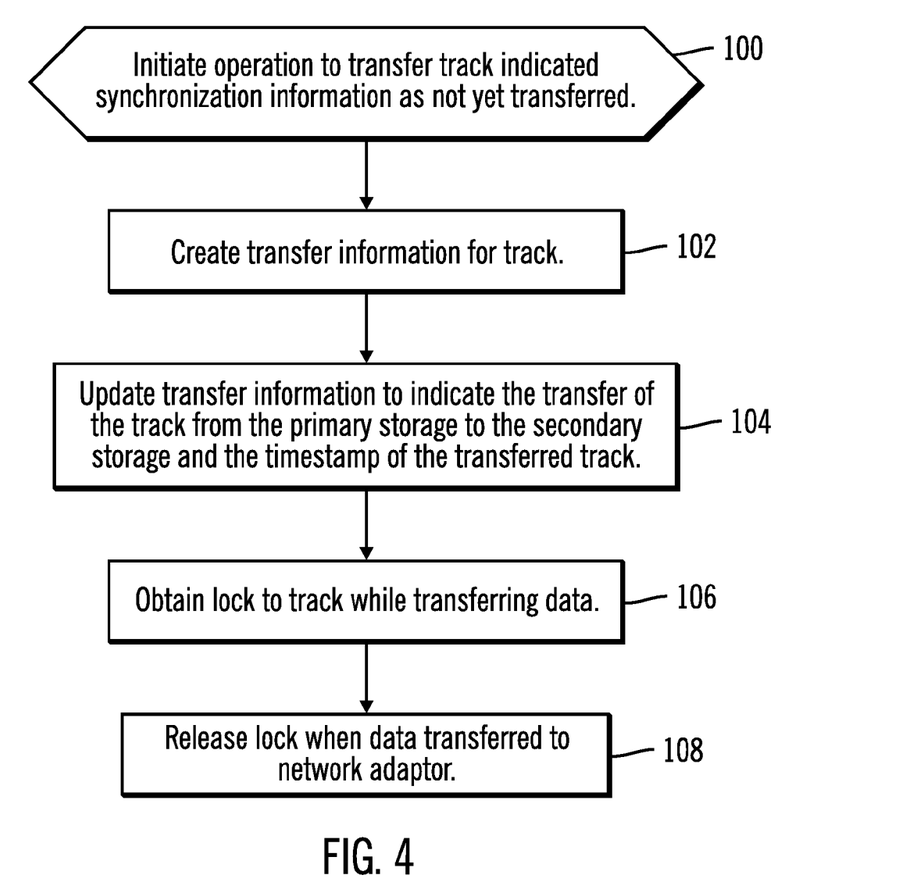
FIG. 4 illustrates an embodiment of operations to transfer a track in a mirror relationship.

FIG. 4 illustrates an embodiment of operations performed by the storage manager 8 to transfer a track indicated in the synchronization information 24 to the secondary storage controller 14. The storage manager 8 may concurrently transfer tracks indicated in the synchronization information 24. Upon initiating (at block 100) an operation to transfer a track indicated in the synchronization information 24 as not yet transferred, the storage manager 8 creates (at block 102) transfer information 50 for the track. The storage manager 8 updates (at block 104) the transfer information 50 to indicate the transfer of the track from the primary storage 6 to the secondary storage 10, such as by setting the transfer-in-progress flag 54 to indicate that a transfer is in progress and by setting the transfer-in-progress timestamp 56 to the timestamp of the track being transferred. The storage manager 8 then obtains (at block 106) a lock to the track being transferred, which may involve setting the lock status 74 for the lock information 70 for the lock to indicate a lock, such as a write lock is held. In one embodiment, the lock may prevent writes, but not prevent reads. The storage manager 8 releases (at block 108) the lock upon receiving notification or acknowledgment that the track has been transferred to the network adapter 28 of the primary storage controller 2. In this way, the track is available to be updated even before the track has been transferred to the secondary storage 12 over the network 36 because the lock for the track is released upon the track being buffered in the network adapter 28 buffer 32.

Figure 5:
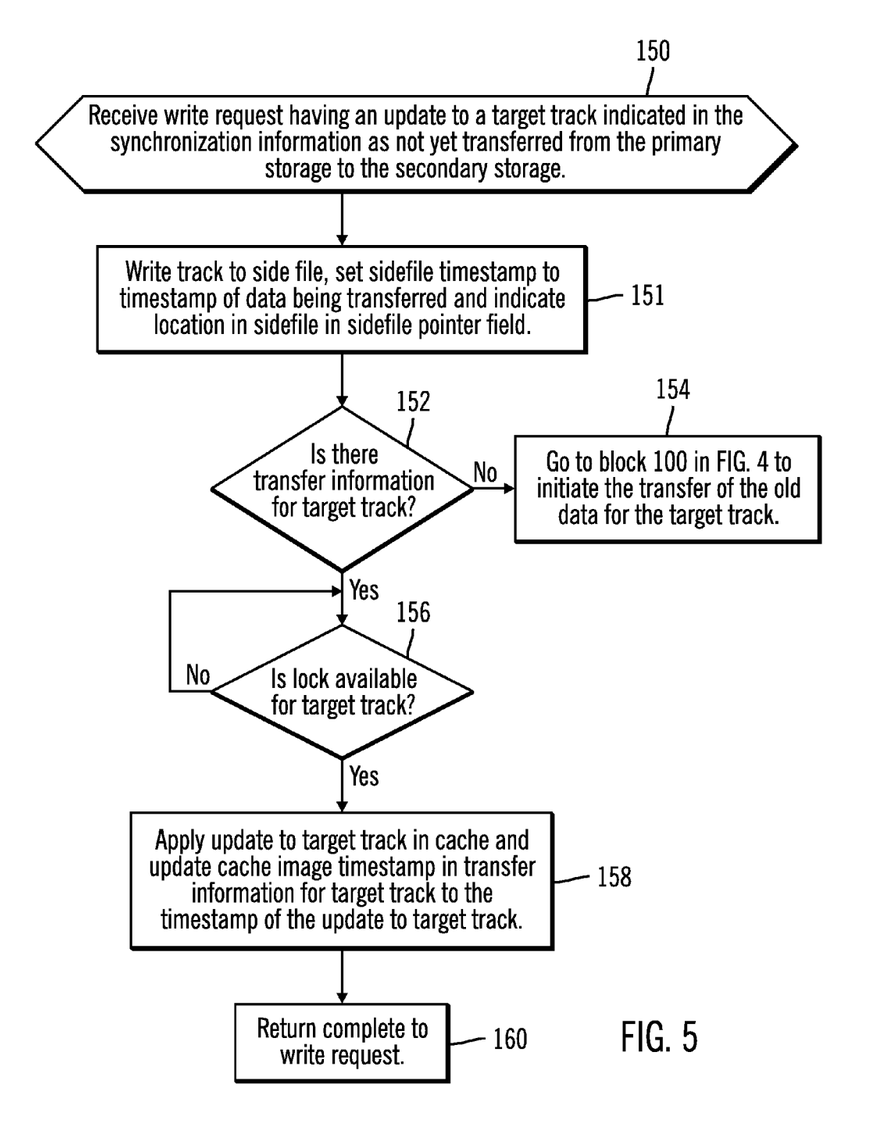
FIG. 5 illustrates an embodiment of operations to process a write request directed to a track in a mirror relationship that has not yet been copied to the secondary storage.

FIG. 5 illustrates an embodiment of operations performed by the storage manager 8 to process a write request from a host 15 comprising an update to a target track indicated in the synchronization information 24 as not yet transferred to the secondary storage 12. Upon receiving (at block 150) such a write request, the storage manager 8 may write (at block 151) the track being transferred to a sidefile 34, and set the sidefile timestamp 60 to the timestamp of the track being transferred and update the sidefile pointer 62 to the address of the track in the sidefile 34. In an alternative embodiment, a sidefile 34 may not be used for transferring tracks as part of synchronization and the track may not be stored in the sidefile during a transfer. In this way, the write to the sidefile is initiated by the host write. In an alternative embodiment, the write to the sidefile may be initiated by the transfer. If (at block 152) there is no transfer information 50 for the target track which has not yet been synchronized, then control proceeds (at block 154) to block 100 in FIG. 4 to initiate the transfer of the old data for the target track, which may be in the cache 18 or the primary storage volume 6. If there is transfer information 50 for the target track, indicting that the track is in progress of being transferred, then a determination is made (at block 156) whether the lock, or write lock, for the track is available. If the lock 70 for the target track is not available, which means the storage manager 8 has not received acknowledgment that the track has been transferred to the adapter 28, then the write request waits for the lock to be released. If (at block 156) the lock is available, indicating that the track has been transferred to the adapter 28, then the lock is provided to the write request and the update is applied (at block 158) to the target track in the cache 18, and the storage manager 8 updates the cache image timestamp 58 in the transfer information 50 for the target track to the timestamp of the update to target track. Once updated in cache 18, complete may be returned (at block 160) to the write request.

In an alternative embodiment, the write request may be allowed to apply the update to the target data unit without using a lock, but only immediately after copying the data in the target data unit to a network adapter of the storage controller, without waiting for the data to be transferred to the secondary controller.

Figure 6:
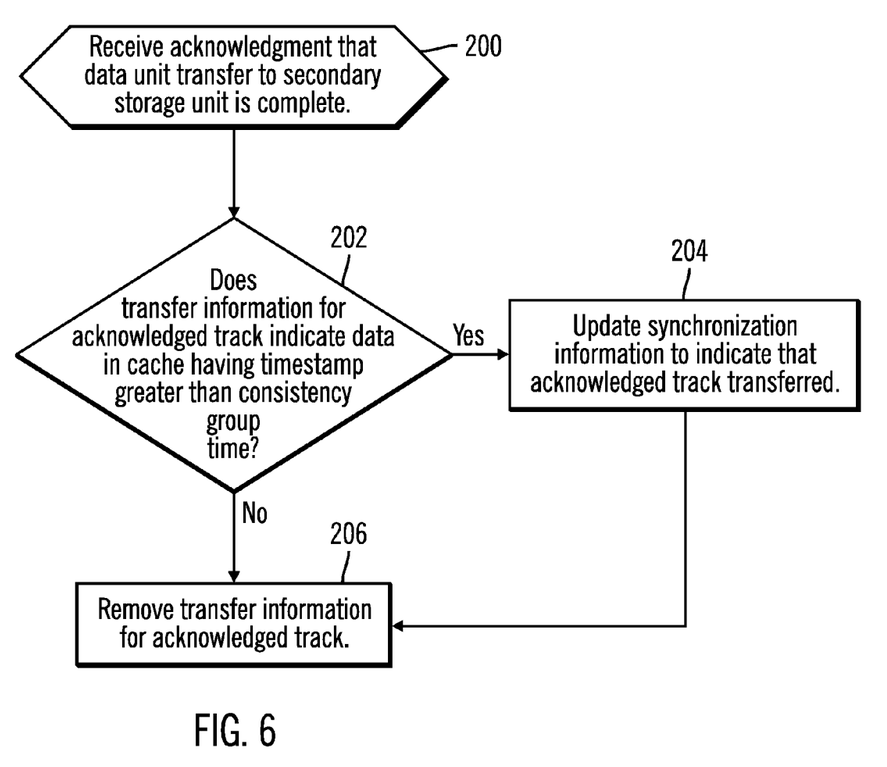
FIG. 6 illustrates an embodiment of operations to process an acknowledgment that a track in a mirror relationship was copied to the secondary storage.

FIG. 6 illustrates an embodiment of operations performed by the storage manager 8 upon receiving notification that the track has been transferred to the secondary storage controller 14. Upon receiving acknowledgment (at block 200) that a transfer of a track has completed to the secondary storage volume 10, which may occur upon the secondary storage controller 14 storing the track in the cache 20 or secondary storage volume 10, a determination is made (at block 202) as to whether the transfer information 50 for the acknowledged track indicates that there is a track in cache 18 (or primary storage 4) having a timestamp 58 (FIG. 2) that is greater than the consistency time, i.e., the timestamp of the consistency group being formed by transferring the tracks indicated in the synchronization information 24 to the secondary storage volume 10.

If (at block 202) the transfer information 50 for the acknowledged track indicates that there data in cache 18 for the acknowledged track having a timestamp greater than the consistency time of the current consistency group being formed, then the synchronization information 24 for the acknowledged track is updated (at block 204) to indicate that the acknowledged track is transferred and the transfer information 50 for the acknowledged track is removed (at block 206). If (at block 202) there is an update to the acknowledged track in the cache 18 whose timestamp 58 is less than the consistency time, i.e., within the consistency group being formed, then control proceeds to block 206 to delete the transfer information 50 for the acknowledged track without updating the synchronization information 24 to indicate that the track has been transferred. Further, data in the cache 18 may be transferred if its timestamp is both less than the consistency group's time and different than the timestamp of the acknowledged transferred data. In this way, the synchronization information 24 maintains the indication to transfer the acknowledged track so that the updated track having a timestamp within the consistency time will be transferred as part of the synchronization for the current consistency group. The transfer of the updated track in cache 18 having the timestamp within the current consistency group being formed may be transferred immediately by proceeding to block 100 in FIG. 3 to transfer the updated track or the updated track may be transferred when the acknowledged track indicated in the synchronization information 24 is subsequently processed as part of processing the synchronization information 24 for the current consistency group. Further, if there is no data for the acknowledged track in cache 18, then the synchronization information 24 may be updated to indicate the track has been transferred.

With the described embodiments, if an updated track in cache 18 has a timestamp greater than the consistency time of the consistency group being formed, then that updated track may remain in cache 18 and be transferred as part of the next consistency group that will be formed. New synchronization information 24 will be generated for the next consistency group to transfer all tracks having a timestamp less than or equal to the consistency time of the next consistency group.

In one embodiment where a copy of a track being transferred is not stored in a sidefile 34, if a transfer of a track to the secondary storage 12 fails, then the consistency group being formed may fail and a new consistency group may be formed. In an alternative embodiment where a sidefile 34 is used to store tracks being transferred, then if the transfer of a track to the secondary storage 12 fails, then the transfer may be retried by transferring the track in the sidefile 34. In a further embodiment, the data unit is transferred from the sidefile 34 after a successful transfer if the time stamp of the data in the sidefile 34 is earlier than the timestamp of the consistency group, and different than the time stamp of the acknowledged transferred data.

In this way, the sidefile 34 need only maintain enough space to store the maximum number of tracks that may be concurrently transferred for one or more mirror relationships. In one embodiment, the retry from the sidefile 34 is performed if the timestamp of the data in the primary cache 18 or storage 4 is greater then the timestamp of the current consistency group. Otherwise the retry will be done from the cache 18 or storage 4.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and a receiving station for transmitting and receiving transmission signals in which the code or logic is encoded, where the code or logic encoded in the transmission signal may be decoded and stored in hardware or a computer readable medium at the receiving and transmitting stations or devices. An "article of manufacture" comprises computer readable storage medium, hardware logic, and/or transmission transmitters or receivers in which code may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining synchronization information indicating data units to transfer from a primary storage to a secondary storage;
    initiating a synchronization operation to transfer data units indicated in the synchronization information as not yet transferred to the secondary storage;
    obtaining locks for the data units being transferred from the primary storage to the secondary storage as part of the synchronization operation;
    transferring the data units subject to the synchronization operation from the primary storage to a buffer in a network adaptor of a storage controller;
    releasing the locks for the data units in response to receiving acknowledgment that the data units have been transferred to the buffer within the network adaptor, wherein the locks are released before the data units are transferred to the secondary storage over the network by the network adaptor;
    transferring the data units in the network adaptor to the secondary storage over the network;
    receiving, by the storage controller, a write request having an update to data in a target data unit comprising one of the data units in the primary storage and indicated by the synchronization information as not having been transferred from the primary storage to the secondary storage;
    determining whether the lock is available for the target data unit; and
    applying the update from the write request to the target data unit in the primary storage in response to determining that the lock is available.

2. The method of claim 1, wherein the synchronization information indicates data units to transfer from the primary storage to the secondary storage as part of a consistency group having a consistency time.

3. The method of claim 2, wherein the consistency group is maintained for asynchronous mirroring, further comprising:
    failing the consistency group in response to the transfer of the data unit to the secondary storage failing.

4. The method of claim 2, further comprising:
    receiving acknowledgment that one of the transferred data units indicated in the synchronization information was transferred to the secondary storage;
    determining whether a cache includes updated data for the acknowledged transferred data unit having a timestamp greater than the consistency time; and
    updating the synchronization information to indicate that the transferred data unit was transferred in response to the cache including updated data for the acknowledged transferred data unit having the timestamp greater than the consistency time, wherein the synchronization information is not updated to indicate that the acknowledged transferred data unit was transferred in response to the cache including the updated data for the acknowledged transferred data unit having the timestamp less than the consistency time.

5. The method of claim 4, wherein the data in the cache having the timestamp greater than the consistency time is transferred to the secondary storage in a subsequent consistency group, wherein the data in the cache is transferred to the secondary storage if the timestamp of the data in the cache is less than the timestamp of the consistency group and different than the time stamp of the acknowledged transferred data unit, and further comprising:

removing the transfer information for the acknowledged transferred data unit.

6. The method of claim 4, further comprising:

creating transfer information identifying one data unit indicated in the synchronization information to transfer to the secondary storage in response to initiating a transfer of the data unit to the secondary storage, wherein the transfer information indicates a transfer-in-progress and a timestamp of the data for the identified data unit being transferred; and updating the transfer information for one identified data unit to indicate a timestamp of an update to the data unit in the cache in response to writing the update to the cache.

7. The method of claim 1, further comprising:

determining whether there is transfer information for the target data unit indicating that the target data unit is in progress of being transferred to the secondary storage in response to receiving the write request when the synchronization data indicates that the target data unit is to be transferred to the secondary storage, wherein the transfer of the target data unit to the secondary storage is initiated in response to receiving the write request when determining that there is no transfer information for the target data unit.

8. The method of claim 1, further comprising:

writing the data unit for the data being transferred to the secondary storage to a sidefile.

9. The method of claim 8, further comprising:

retrying to transfer the data unit from the sidefile to the secondary storage in response to the transfer of the data unit to the secondary storage failing; and transferring the data unit from the sidefile after a successful transfer in response to determining that the timestamp of the data in the sidefile is earlier than the time stamp of the consistency group, and different than the time stamp of acknowledged transferred data.

10. A system in communication with a primary storage and a secondary storage over a network, comprising:

a network adaptor having a buffer, wherein data units to transfer from the primary storage to the secondary storage are buffered in the network adaptor before being transferred to the secondary storage over the network by the network adaptor; and a storage manager executed to perform operations, the operations comprising:

maintaining synchronization information indicating data units to transfer from the primary storage to the secondary storage;

initiating a synchronization operation to transfer data units indicated in the synchronization information as not yet transferred to the secondary storage;

obtaining locks for the data units being transferred from the primary storage to the secondary storage as part of the synchronization operation;

transferring the data units subject to the synchronization operation from the primary storage to the secondary storage to the buffer in the network adaptor;

releasing the locks for the data units in response to receiving acknowledgment that the data units have been transferred to the buffer within the network adaptor, wherein the locks are released before the data units are transferred to the secondary storage over the network by the network adaptor;

transferring the data units in the network adaptor to the secondary storage over the network;

receiving a write request having an update to data in a target data unit comprising one of the data units in the primary storage and indicated by the synchronization information as not having been transferred from the primary storage to the secondary storage;

determining whether the lock is available for the target data unit; and applying the update from the write request to the target data unit in the primary storage in response to determining that the lock is available.

11. The system of claim 10, wherein the synchronization information indicates data units to transfer from the primary storage to the secondary storage as part of a consistency group having a consistency time.

12. The system of claim 11, wherein the operations further comprise:

receiving acknowledgment that one of the transferred data units indicated in the synchronization information was transferred to the secondary storage;

determining whether a cache includes updated data for the acknowledged transferred data unit having a timestamp greater than the consistency time; and updating the synchronization information to indicate that the transferred data unit was transferred in response to the cache including updated data for the acknowledged transferred data unit having the timestamp greater than the consistency time, wherein the synchronization information is not updated to indicate that the acknowledged transferred data unit was transferred in response to the cache including the updated data for the acknowledged transferred data unit having the timestamp less than the consistency time.

13. The system of claim 12, wherein the data in the cache having the timestamp greater than the consistency time is transferred to the secondary storage in a subsequent consistency group, wherein the data in the cache is transferred to the secondary storage if the timestamp of the data in the cache is less than the timestamp of the consistency group and different than the time stamp of the acknowledged transferred data unit, and wherein the operations further comprise:

removing the transfer information for the acknowledged transferred data unit.

14. The system of claim 10, wherein the operations further comprise:

writing the data unit for the data being transferred to the secondary storage to a sidefile;

retrying to transfer the data unit from the sidefile to the secondary storage in response to the transfer of the data unit to the secondary storage failing; and transferring the data unit from the sidefile after a successful transfer in response to determining that the timestamp of the data unit in the sidefile is earlier than the time stamp of the consistency group, and different than the time stamp of acknowledged transferred data unit.

15. An article of manufacture comprising a computer readable medium having code executed in a storage controller, having a network adaptor, to communicate with a primary and secondary storages, and to cause operations, the operations comprising:

maintaining synchronization information indicating data units to transfer from a primary storage to a secondary storage;

initiating a synchronization operation to transfer data units indicated in the synchronization information as not yet transferred to the secondary storage;

obtaining locks for the data units being transferred from the primary storage to the secondary storage as part of the synchronization operation;

transferring the data units subject to the synchronization operation from the primary storage to a buffer in the network adaptor;

releasing the locks for the data units in response to receiving acknowledgment that the data units have been being transferred to the buffer within the network adaptor, wherein the locks are released before the data units are transferred to the secondary storage over the network by the network adaptor;

transferring the data units in the network adaptor to the secondary storage over the network;

receiving a write request having an update to data in a target data unit comprising one of the data units in the primary storage and indicated by the synchronization information as not having been transferred from the primary storage to the secondary storage;

determining whether the lock is available for the target data unit; and applying the update from the write request to the target data unit in the primary storage in response to determining that the lock is available.

16. The article of manufacture of claim 15, wherein the synchronization information indicates data units to transfer from the primary storage to the secondary storage as part of a consistency group having a consistency time.

17. The article of manufacture of claim 16, wherein the operations further comprise:

receiving acknowledgment that one of the transferred data units indicated in the synchronization information was transferred to the secondary storage;

determining whether a cache includes updated data for the acknowledged transferred data unit having a timestamp greater than the consistency time; and updating the synchronization information to indicate that the transferred data unit was transferred in response to the cache including updated data for the acknowledged transferred data unit having the timestamp greater than the consistency time, wherein the synchronization information is not updated to indicate that the acknowledged transferred data unit was transferred in response to the cache including the updated data for the acknowledged transferred data unit having the timestamp less than the consistency time.

18. The article of manufacture of claim 17, wherein the data in the cache having the timestamp greater than the consistency time is transferred to the secondary storage in a subsequent consistency group, wherein the data in the cache is transferred to the secondary storage if the timestamp of the data in the cache is less than the timestamp of the consistency group and different than the time stamp of the acknowledged transferred data unit, and further comprising:

removing the transfer information for the acknowledged transferred data unit.

19. The article of manufacture of claim 15, wherein the operations further comprise:

writing the data unit for the data being transferred to the secondary storage to a sidefile;

retrying to transfer the data unit from the sidefile to the secondary storage in response to the transfer of the data unit to the secondary storage failing; and transferring the data unit from the sidefile after a successful transfer in response to determining that the timestamp of the data unit in the sidefile is earlier than the time stamp of the consistency group, and different than the time stamp of acknowledged transferred data unit.

* * * * *